United States Patent [19]

Amy

[11] Patent Number: 4,772,063
[45] Date of Patent: Sep. 20, 1988

[54] TRAILER FOR HAULING AUTOMOTIVE EXHAUST SYSTEM PARTS

[76] Inventor: David T. Amy, 15434 Bealfred Dr., Fenton, Mich. 48430

[21] Appl. No.: 93,634

[22] Filed: Sep. 8, 1987

[51] Int. Cl.$^4$ ............................................. B62D 25/00
[52] U.S. Cl. .................................. 296/37.1; 296/181;
296/24.1; 224/42.41; 414/347; 410/36
[58] Field of Search ................ 296/37.1, 24 R, 181;
410/32, 36; 224/42.41; 414/347

[56] References Cited

U.S. PATENT DOCUMENTS

| | | | |
|---|---|---|---|
| 3,561,621 | 2/1971 | Riners, Jr. | 414/347 |
| 3,741,604 | 6/1973 | Heath | 296/37.1 |
| 4,418,853 | 12/1983 | Shaffer | 224/42.41 |
| 4,449,746 | 5/1984 | Clark | 296/24 R |
| 4,564,134 | 1/1986 | Seibert | 296/37.1 |

Primary Examiner—Robert R. Song
Attorney, Agent, or Firm—Cullen, Sloman, Cantor, Grauer, Scott and Rutherford

[57] ABSTRACT

A trailer for hauling and for delivery to a number of different delivery sites, automotive exhaust system parts, such as mufflers, pre-bent tail pipes and the like packed in large shipping containers, and, also, bundles of numerous straight tube lengths, is provided with a normally closed cabinet attached beneath its floor between its rear road wheels and its forward tractor connecting fifth wheel. The cabinet is divided into longitudinally elongated bins, each of about the same length as the straight tubes, for receiving and holding the bundles of straight tubes in longitudinal arrangement relative to the trailer axis. The sides of the bins are openable so that the tube bundles can be inserted and removed in a transverse direction relative to the trailer axis. A fork truck is releasably mounted upon the rear end of the trailer for use in unloading tube bundles in a transverse direction out of the bins at different delivery sites. The lengths of the containers are dimensionally close to the width of the trailer so that the containers are arranged transversely of the trailer axis for filling a substantial portion of the interior of the trailer during hauling. The containers are removable from the rear of the trailer by using a manual dolly carried within the trailer to move the containers to the rear of the trailer where the containers may be removed and carried by the fork truck at their respective delivery sites.

13 Claims, 1 Drawing Sheet

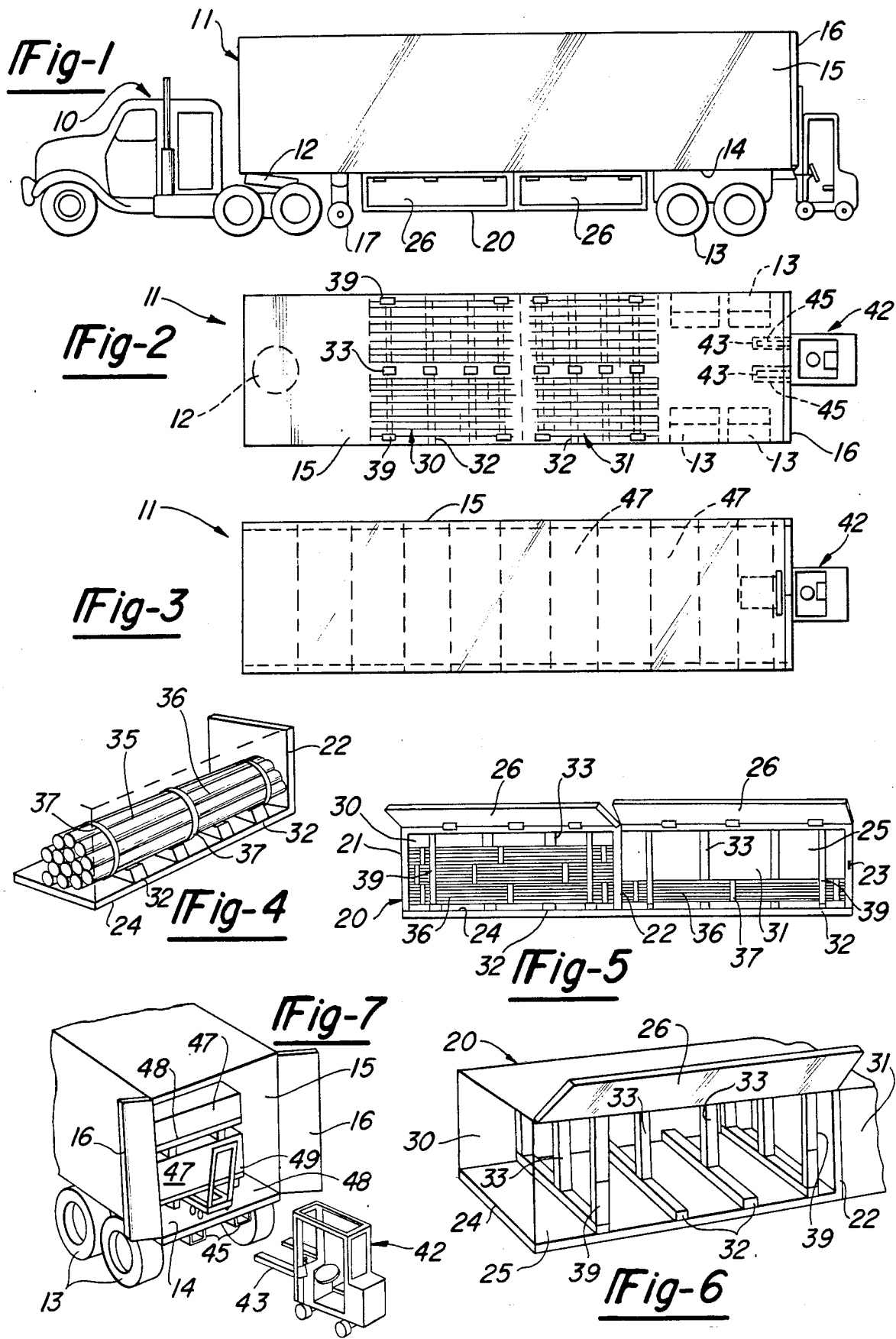

TRAILER FOR HAULING AUTOMOTIVE EXHAUST SYSTEM PARTS

BACKGROUND OF INVENTION

This invention relates to an improved trailer system for hauling and delivering automotive exhaust system parts, such as mufflers, bent and straight pipes and the like, from central warehouse locations to dispersed installation shops. Over a period of time, the parts which form the exhaust system of an automotive vehicle require replacement because these parts become damaged in use, rust out, or otherwise become unserviceable. Consequently, it is common to replace the exhaust system, or parts of an exhaust system, at after-market installation shops or automotive vehicle service garages or, in some cases, by the owner of the vehicle who purchases the necessary parts at a supply store. The invention of this application relates to a system for delivering the necessary parts to such installation shops, garages or supply stores.

Vehicle exhaust systems generally comprise exhaust tubes, mufflers, tail pipes, pollution control devices, and various fittings, hangers, or supports, and the like. It is customary for the suppliers of these parts to warehouse them after they are manufactured and to deliver them to the points of installation or to the stores for availability to the consumers. This is espcially true in the case of chain installation centers which basically are dedicated to the repair and replacement of exhaust systems. The delivery of the parts from the warehouses to the installation sites is basically accomplished by delivery trucks. In many cases, these trucks are large, over-the-road vehicles having large trailers towed by long-distance tractors. Thus, a central warehouse, which contains an inventory of automotive vehicle parts for different kinds of vehicles, may serve as the supply center for widely-dispersed installation or distribution sites. Consequently, it is common to load the large, over-the-road trailers with parts to be delivered at a number of different sites along a single, long distance delivery run. The amount of goods which these trailers can carry, particularly where a large number of different orders to be shipped on a single run, and, more importantly, the amount of time and the amount of labor needed for unloading the specific orders at each of the sites, are important features in the costs of the goods. In addition, because delivery to individual sites has typically taken considerable time and labor, it has been necessary to use numerous smaller warehouses interspersed within relatively small delivery areas, rather than to use larger warehouses servicing very much larger areas.

Where deliveries of partial loads are made to separate sites along a single run, the unloading of the order at each site is a problem because of the need for considerable labor. Thus, the delivery, for example, of a single order containing a number of parts to a single installation shop, has required a number of people for unloading the goods from the truck and carrying them to their use or storage places. However, small installation shops or relatively small stores typically do not have adequate personnel for unloading. Thus, the regular personnel must be used to unload. These must be taken away from their regular duties. Thus, frequently they cannot be used while they are otherwise occupied, and therefore, time must be spent in waiting until they are available for unloading work. Moreover, because of the lack of unloading docks at most delivery sites, the delivered parts must be manually handled to get them out of the trailer and into the delivery location. That increases the unloading time and the amount of labor needed.

It is common, because the wide variety of automotive vehicles which have been produced in the past and which from time to time need exhaust tubing, to utilize straight tubes which are bent into the required configuration during use at the installation site. That is, it is not feasible for an installation shop to maintain a complete inventory of pre-bent tubing for each of the numerous automotive vehicles available. Hence, a large amount of straight tubing is kept at installation shops and is bent by the installers at the time of installation when pre-bent tubing is not on hand. The delivery of such straight tubing with pre-bent tubing, mufflers, catalytic converters, hardware, and the like, has presented a delivery problem because hauling small quantities of straight tubing interferes with fully loading a delivery trailer. The problem arises because straight tubing is too long to fit crosswise in a regular road trailer and is typically shipped in bundles of tubes, which are tied together with strapping. Thus, the bundles of tubes must be arranged longitudinally within the trailer. Bundling the tubes together helps to protect them against being crushed or broken during shipment. However, to avoid excessive forces upon the tubing, the bundles within the trailer may not be stacked beyond a relatively low height, as for example, less than two feet. However, a typical trailer may have an interior height of roughly eight feet so that the space above the bundles is unused. Further, because the bundles of tubing occupy space along the interior length of the trailer, containers of the other parts are difficult to arrange and stack to utilize the full height and width of the trailer. As a result, the amount of material that can be carried by the trailer in a single load which includes bundles of straight tubing, is limited.

A typical trailer can handle considerably more weight than is provided by the volume of exhaust system parts that can be fitted within the trailer box when straight tubing must be carried along with other parts. Hence, there has been a need for a system by which larger quantities of straight tubing and other exhaust system parts can be carried together in one trailer load without the tubes reducing the quantity of other parts that can be carried in that one load. In addition, there has been a need for a system for packing and hauling a full load of automotive exhaust system parts in which portions of the load may be rapidly unloaded at disbursed delivery sites by the driver, alone, or with his assistant, without the need to use local, installation site personnel for unloading.

This invention relates to an improved system by which the load carried on a single delivery run may be substantially increased, by as much as a third more, and yet, the goods may be unloaded at the delivery site, by a driver, in a matter of minutes.

SUMMARY OF THE INVENTION

The invention herein contemplates a delivery system in which the commonly used, straight tube lengths are separated from the remainder of the exhaust parts and are carried beneath the delivery trailer so as to completely free the trailer box for carrying containers to its full height and width. The system contemplates packing the exhaust system parts, excluding the straight tubing, within large quantities whose lengths are approximately the same as the width of the interior of the trailer box so that they may be arranged transversely of the trailer box and stacked to the roof of the trailer. Thus, the boxes containing parts such as mufflers, pre-bent tubing, etc., may be delivered out the rear end of the trailer. Meanwhile, the long, straight tubes are carried in bins below the trailer and may be removed transversely, that is, sideways, of the trailer from beneath the trailer. Further, the trailer is adapted to carry its own lift truck on its rear end and may also have, either within the trailer or upon it, a separate hand dolly. Hence, with this system, the tractor driver or his assistant, if he has one, may themselves unload containers from the trailer box by moving the containers to the rear opening of the box with the hand dolly and then utilizing the lift truck to lift the containers from the trailer and to move them to the required location at the delivery site. Further, the individual lift truck operator can, without additional labor, quickly remove tied-together bundles of straight tubing by utilizing the lift truck to remove the tubes sideways out of their carrying bins that are located under the trailer.

Since the system utilizes a lift truck, such as a small-size fork truck, which is carried upon the trailer, along with a hand dolly for moving things witin the trailer, the truck driver or his assistant or both may unload an order at a delivery site in a very short time, as for example, within ten or fifteen minutes. This contrasts with the previous need for considerable local labor to manually lift and carry the delivered parts out of the trailer, especially since loading docks and lift trucks are normally not available at typical installation shops and stores.

This system includes a mounting means formed on the rear end of the trailer by which the lift truck may be readily attached and detached from the truck. For example, elongated tubes or channels may be fastened beneath the trailer, upon the trailer bed, so that two separate fork elements of a fork lift truck may be slid into the channels for connecting the fork lift truck to the trailer. Thereafter, by lowering the fork relative to the truck, the truck will be raised above the ground for carrying by the trailer. Reversely, raising the fork relative to the truck will result in the lift truck being lowered to the ground for immediate use. In this manner, a single individual can rapidly attach or detach the lift truck from the trailer for transport or for use.

An object of this invention is to provide an efficient, low-labor system, by which a delivery truck may be substantially fully loaded for a long run and wherein portions of the load may be rapidly removed from the delivery truck at delivery sites by the driver. Thus, the delivery does not require local personnel at the delivery site or local delivery equipment for moving the delivered goods.

Another object of this invention is to permit the use of fewer, large, central warehouses containing large quantities of different exhaust system parts, which may be loaded into a delivery trailer for delivery to wide spread disbursed sites along very long delivery routes. Because the delivery trailer may be loaded more fully than previously, and because the individual orders may be rapidly unloaded from the truck by the driver, the lengths of the delivery routes may be much longer than feasible in the past. This eliminates the need of numerous, localized warehouses. Consequently, the cost of warehousing and the amount of goods warehoused may be substantially reduced. Likewise, the delivery costs are substantially reduced and the cost of local labor at the delivery sites is eliminated.

Still a further object of this invention is to substantially increase the ability of a delivery trailer to carry considerable more exhaust system parts and to better protect the long, straight exhaust tubes during transit.

These and other objects and advantages of this invention will become apparent upon reading the following description, of which the attached drawings form a part.

DESCRIPTION OF DRAWINGS

FIG. 1 is a side, elevational view of a tractor-trailer rig.

FIG. 2 is a top, plan, schematic view of the trailer, per se, schematically illustrating the location of bundles of straight tubes beneath the trailer box.

FIG. 3 is a top, plan, schematic illustration of the trailer and the locations of packing containers within the trailer box.

FIG. 4 is a perspective view of a bundle of straight tubes shown within a fragmentary portion of a carrying bin.

FIG. 5 is a front, elevational view, drawn to a larger scale, of the tube-carrying cabinet.

FIG. 6 is a perspective, fragmentary view of the tube-carrying cabinet forward compartment, with its side-by-side bins.

FIG. 7 is a fragmentary, perspective, schematic view of the open rear end of the trailer and the hand dolly and lift truck used for unloading containers from within the trailer box.

DETAILED DESCRIPTION

FIG. 1 illustrates a conventional over-the-road tractor-trailer rig comprising a tractor 10 towing a trailer 11. The trailer is connected to the tractor by a conventional fifth wheel connection 12. The trailer includes a number of road-engaging wheels 13 which are mounted on the bottom of the floor or bed 14 of the trailer box or compartment 15.

The trailer box is opened at its rear end, and the opening is closed by conventional rear doors 16 that are hingedly connected to the side, rear edges of the box in the conventional manner. In addition, conventional crank-down front support wheels 17 are mounted upon the trailer floor or bed 14. These can be cranked up for towing of the trailer and cranked down to engage the ground when the trailer is to be disconnected from the tractor.

An elongated cabinet 20 is fastened to the bottom of the trailer floor or bed 14 between the wheels 13 and the crank-down forward support wheel 17. Preferably, the cabinet extends transversely for the full width of the trailer box, as schematically illustrated.

The cabinet is formed with a forward transverse wall 21, a middle transverse wall 22, a rear transverse wall 23, and with a floor 24. The opposite sides of the cabinet are open to provide side openings 25 along the side edges of the trailer. These openings are closed by suitable doors 26 which may be connected by hinges to the cabinet.

The walls divide the cabinet into a forward compartment 30 and a rear compartment 31. Support rails 32 may be fastened upon the cabinet floor 24 to extend transversely of the cabinet. Preferably, center posts or center wall sections 33, which are aligned longitudinally of the axis of the trailer, divide the cabinet and its compartments into separate side bins. However, these center posts may be either omitted or removed to permit the compartments to function as complete bins.

The compartments or bins are sized in the longitudinal direction, that is, relative to the longitudinal axis of the trailer, to closely receive typical straight exhaust tubes 35. The tubes are preferably assmebled in groups to make up bundles 36 which are held together by straps 37. These tubes are commonly made in ten-foot lengths. They are bent by the installation mechanics to fit within vehicles in instances where suitable pre-bent tubes are not in stock. That sort of tubing is commonly used for vehicles whose numbers are limited, such as old models, foreign models, and the like, where it is not economical to inventory pre-bent tubes. Also, the straight tubes may be used for those vehicles where an unbent, straight tube section is required.

When the bundles of tubes are inserted in the bins, they are held in place by vertical, telescoping posts 39 which extend from the rails to the upper portion of the cabinet. Any suitable, easily-removable, length-adjustable posts may be used. For example, the posts may comprise a square cross-section tube within which a smaller tube of similar configuration is telescoped. The two tubes may be telescoped together to reduce their height or, alternatively, telescoped apart to increase the height of the post. A suitable locking mechanism can be used to maintain the selected height of the posts. Alternatively, the tubes may consist of an outer tube within which a smaller inner diameter inner tube is telescoped, with suitable springs tending to maintain the tubes in an outwardly extended direction. These kinds of posts are conventional. It is sufficient to point out that vertical posts of some kind are preferred to prevent the bundles of tubes from rolling or transversely moving in the bins within which they are held.

As can be seen, since the bins open sideways or transversely of the axis of the trailer, the bundles of tubes may be inserted or removed from their respective bins sideways. Since the tube lengths correspond to the lengths of their bins, the tubes tend to remain in position, without shifting forwardly or rearwardly, although it may be desirable to place packing material between the ends of the bundles and their adjacent transverse walls.

A conventional, small-size lift vehicle 42, such as a self-propelled fork truck, is schematically illustrated in the drawings. The vehicle has a lift or fork formed of a pair of parallel fork members 43.

Fork member-receiving channels or tubes 45 are mounted at the rear end of the trailer box beneath and attached to the trailer floor or bed by suitable mechanical fasteners (not shown). Thus, the operator of the fork truck can raise the fork until the two fork members 43 are level with the fork-receiving channels 45. Then by driving the vehicle towards the trailer, the fork members are received within the respective channels 45. At that point, the fork may be lowered relative to the vehicle. Since the fork is fixed in horizontal position, the vehicle will raise up above the ground. Hence, the vehicle can be carried by the trailer. To avoid the possibility of the vehicle falling off the trailer, suitable chains and ties can (not illustrated) be provided to securely tie the lift vehicle to the trailer.

The exhaust system parts, exclusive of the straight tubes, typically are either packaged loosely in large boxes, or they may be individually packed in their own separate boxes. For example, a separate box may contain a single muffler. These parts, whether boxed or unboxed, may be packaged in large shipping containers 47. the containers are almost as long as the distance between the sidewalls of the trailer box. Thus, they can be transversely arranged within the trailer box, as schematically illustrated in FIG. 3. Because of their large size, they remain in position despite weaving or swaying of the trailer. Further, these containers may be stacked one upon the other so as to substantially fill the trailer box to its full height (see FIG. 7).

For a long delivery run involving a number of separate delivery sites, the containers may be placed within the box in reverse order of removal. That is, the first to be removed should be at the rear end of the trailer near the doors. The shipping containers preferably are mounted upon pallets 48. The containers may be manually moved to the rear of the trailer box by means of a manually operated hand dolly 49. A hand dolly or similar wheeled device can be kept within the trailer box or mounted on the outside of the trailer box for use in moving the boxes towards the opening of the trailer. The dolly may be slipped underneath the containers in the spaces provided by their pallets. When the containers are moved close to the rear opening of the trailer, the lift truck 42 may pick them up, remove them from the trailer, and then carry them to any desired location at the delivery site.

As can be seen, when the containers and bundles of tubes are appropriately located within the trailer box and the tube bins, they may be rapidly unloaded by one person using the unloading dolly and the lift truck. Thus, a driver may unload a specific order in a matter of minutes. That makes it possible to rapidly deliver an order to a particular site and to leave, without relying upon either local personnel, loading docks, or local unloading and moving equipment.

This invention may be further developed within the scope of the following claims. Having fully described an operative embodiment of this invention, I now claim:

1. In a trailer for transporting automotive exhaust system parts to separate delivery sites along a single trailer delivery run, with such parts including numerous similar length, straight tubes of the type to be bent by installers for installation upon automotive vehicles in an installation shop, and with the trailer formed of an elongated trailer box having a support bed and road-engaging wheels rotatably mounted to the bed, beneath the rear end portion of the trailer box, and having a tractor connection mounted beneath the forward end of the trailer box for connecting the trailer to a tractor, the improvement comprising:

a tube hauling cabinet secured to the trailer box beneath the bed and between the wheels and the tractor connection and extending a substantial portion of the width of the trailer, with said cabinet having a forward end wall and a rear end wall arranged transversely of the trailer box, with the walls being longitudinally spaced apart, relative to the longitudinal axis of the trailer, a distance slightly greater than the lengths of said straight tubes, and with the sides of the cabinet being open along their lengths, but being normally closed with openable door-like closures, to form a tube bin which opens at the opposite sides of the trailer;

means for retaining a substantial number of straight tubes within the bin, between the end walls and with the tubes oriented longitudinally of the trailer so that the tubes may be placed into and removed from the bin, when the closures are opened, in a direction transverse to the trailer axis;

whereby a relatively large quantity of tubes may be carried within the tube cabinet, beneath the trailer, on a delivery run, and selected numbers of such tubes may be removed sideways, relative to the trailer, for delivery at selected delivery sites along the tractor-trailer delivery run, and the trailer box may be utilized for carrying the packed containers for filling a substantial portion of the trailer box without interference by otherwise requiring the carrying of said straight tubes within the trailer box.

2. A trailer as defined in claim 1, and including said cabinet having an additional transverse wall spaced forwardly of said forward transverse wall to form an additional bin longitudinally aligned with the first-mentioned bin and similarly provided with side openings and openable closures for said openings, for transversely receiving and unloading, and for holding additional straight tubes.

3. A trailer as defined in claim 1, and with groups of said straight tubes normally being tied together into bundles of parallel tubes;

and said cabinet having a floor with support means which support the bundles of tubes in the lowermost bundles spaced slightly above the floor, whereby the fork of a fork lift truck may be inserted transversely relative to the trailer, beneath the bundles of tubes for sidewise removal of bundles out of their adjacent cabinet openings at a delivery site.

4. A trailer as defined in claim 3, and including a fork lift truck having a lift tongue, and means for releasably mounting the fork lift truck upon the rear of the trailer at a distance above the ground for transporting the truck upon the trailer and for releasing the truck from the trailer for use in unloading at selected delivery sites.

5. A trailer as defined in claim 4, and including the fork of said fork lift truck being formed of two spaced-apart parallel, forwardly-directed tongue members;

and a pair of channel members formed on the rear end portion of the trailer and opening rearwardly for endwise insertion of the tongue members into said channel members for supporting ad connecting the tongue members to the rear of the trailer;

whereby the fork may be raised to the level of the channel members with its tongue members inserted in and supported by the channel members, and thereafter, the fork may be moved relatively in a direction to lower it with respect to the fork lift truck to consequently raise the truck upwardly, off the ground, relative to the fork tongue members' location within the channel members, for thereby carrying the truck upon the trailer, and conversely, the lift truck may be lowered into contact with the ground by relatively raising the fork so that the fork truck may be used at a delivery site.

6. A trailer as defined in claim 1, and with the length of said parts containers normally being about the same as the width of the trailer, so that the containers may be arranged in a transverse direction within the trailer box and stacked one upon another in that arrangement, whereby the trailer may be substantially filled with such containers.

7. A trailer as defined in claim 6, and including a manually operable dolly normally carried along with the trailer for manually moving the containers that are arranged within the trailer box to the rear of the trailer for unloading the containers by the fork truck at a delivery site.

8. In a trailer delivery system for transporting automotive exhaust system parts, including numerous similar length, straight tubes of the type to be bent by installers at installation sites for installation upon automotive vehicles, and large containers packed with automotive exhaust mufflers, bent tail pipes and the like, including a tractor-towed trailer formed of an elongated trailer box having a support bed with road-contacting wheels rotatably mounted upon the bed beneath the rear end portion of the trailer box, and with a tractor-engaging connection mounted upon the support bed beneath the forward end portion of the trailer box, the improvement comprising:

a tube cabinet secured to the trailer box beneath the bed and between the wheels and the tractor connection means, with the cabinet forming a bin within which bundles of numerous, similar length, straight tubes may be arranged longitudinally relative to the longitudinal axis of the trailer, and the cabinet having side closures which may be selectively openable to open the sides of the cabinet along the full lengths of a bundle of straight tubes, so that the bundles of tubes may be inserted and removed from the cabinet in directions transverse to the axis of the trailer;

and means for supporting the tubes and holding them generally immovably within the cabinet;

the trailer box being adapted to receive and haul the containers within which parts are packed while the straight tubes are hauled within the cabinet beneath the trailer box, without interfering with the loading or the arrangement of the containers within the trailer box, and wherein the trailer may be loaded for a delivery run and then partially unloaded at different delivery sites along the delivery run by utilizing a lift truck vehicle for unloading the containers rearwardly out of a rear opening in the trailer and unloading bundles of tubes sideways out of the side openings in the cabinet.

9. A construction as defined in claim 8, and including a lift truck having a vertically movable lift portion for positioning beneath a load and raising the load;

and means on the rear of the trailer for supporting the lift vehicle above the ground and upon the trailer during movement of the trailer and for selectively releasing the lift vehicle from the trailer for use at delivery sites for unloading portions of the containers and tubes carried by the trailer.

10. A construction as defined in claim 9, and said lift vehicle comprising a fork truck having a pair of spaced apart fork elements for lifting objects, and fork element receptacles mounted upon the rear of the trailer and extending rearwardly for receipt of the fork elements so that upon movement of the fork relative to the vehicle, with the fork inserted within such means, the truck may be lifted or lowered relative to the trailer for being carried thereby.

11. A construction as defined in claim 10, and including said containers normally being about the same length as the width of the trailer so that such containers may be stored transversely within the trailer box and stacked upon each other transversely of the trailer box for substantially filling the trailer with such containers.

12. A construction as defined in claim 11, and including a manually-operable dolly normally carried by the trailer for manually moving the containers to the rear of the truck for unloading by the lift vehicle at predetermined delivery sites.

13. A construction as defined in claim 8, and including vertically arranged, central dividers positioned within the cabinet for subdividing the cabinet into a number of separate bins, each opening sideways through the side opening of the cabinet and each extending a length which is slightly greater than the tube lengths.

* * * * *

UNITED STATES PATENT AND TRADEMARK OFFICE
CERTIFICATE OF CORRECTION

PATENT NO. : 4,772,063

DATED : September 20, 1988

INVENTOR(S) : David T. Amy

It is certified that error appears in the above-identified patent and that said Letters Patent is hereby corrected as shown below:

Col. 7, line 31, after the words "adjacent cabinet", insert the word --side--

Col. 7, line 45, the word "ad" should be --and--

Signed and Sealed this

Twenty-first Day of February, 1989

*Attest:*

DONALD J. QUIGG

*Attesting Officer*  *Commissioner of Patents and Trademarks*